United States Patent
Lee et al.

(10) Patent No.: US 9,013,779 B2
(45) Date of Patent: Apr. 21, 2015

(54) ELECTROWETTING DISPLAY APPARATUS

(75) Inventors: Hee-Keun Lee, Suwon-si (KR); pilsook Kwon, Incheon (KR); Jinbo Shim, Seoul (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 31 days.

(21) Appl. No.: 13/426,131

(22) Filed: Mar. 21, 2012

(65) Prior Publication Data

US 2013/0050801 A1     Feb. 28, 2013

(51) Int. Cl.
*G02B 26/00* (2006.01)
*G02F 1/1343* (2006.01)
*G02F 1/1362* (2006.01)

(52) U.S. Cl.
CPC ............ *G02B 26/005* (2013.01); *G02B 26/004* (2013.01); *G02F 1/134363* (2013.01); *G02B 2207/115* (2013.01); *G02F 1/136286* (2013.01); *G02F 2001/134345* (2013.01)

(58) Field of Classification Search
CPC ............ G02B 26/0841; G02B 26/005; G02B 26/004; G02B 2207/115; G02F 1/167
USPC ............................ 359/290–296; 345/105–108
See application file for complete search history.

(56) References Cited

U.S. PATENT DOCUMENTS

| | | | |
|---|---|---|---|
| 5,728,591 A * | 3/1998 | Takahashi et al. | 438/30 |
| 7,561,131 B2 | 7/2009 | Ijzerman et al. | |
| 7,602,465 B2 * | 10/2009 | Kim et al. | 349/141 |
| 7,746,540 B2 * | 6/2010 | Lo et al. | 359/290 |
| 7,834,842 B2 * | 11/2010 | Ikeda et al. | 345/107 |
| 7,847,996 B2 * | 12/2010 | Chen et al. | 359/228 |
| 7,978,399 B2 * | 7/2011 | Yamazaki et al. | 359/296 |
| 8,164,823 B2 * | 4/2012 | Ikegami et al. | 359/296 |
| 2008/0204370 A1 | 8/2008 | Feenstra et al. | |
| 2009/0316253 A1 * | 12/2009 | Fairley et al. | 359/292 |
| 2011/0157678 A1 * | 6/2011 | Chen et al. | 359/290 |
| 2012/0057217 A1 * | 3/2012 | Ku et al. | 359/290 |

FOREIGN PATENT DOCUMENTS

| | | |
|---|---|---|
| JP | 2006519412 | 8/2006 |
| JP | 2007-328233 | 12/2007 |
| JP | 2008532082 | 8/2008 |
| KR | 1020050106031 | 11/2005 |

* cited by examiner

*Primary Examiner* — Ricky Mack
*Assistant Examiner* — Daniele Manikeu
(74) *Attorney, Agent, or Firm* — F. Chau & Associates, LLC

(57) ABSTRACT

An electrowetting display apparatus includes an array substrate, an opposite substrate, and an electrowetting layer. The array substrate includes a base substrate having a plurality of pixel areas and a plurality of pixel electrodes respectively arranged in each of the pixel areas. The pixel electrodes in each pixel area are spaced apart from each other at regular intervals and each have an island pattern shape.

20 Claims, 11 Drawing Sheets

ELECTROWETTING DISPLAY APPARATUS

CROSS-REFERENCE TO RELATED APPLICATION

This application claims priority to Korean Patent Application No. 10-2011-0084134 filed on Aug. 23, 2011, the contents of which are herein incorporated by reference in its entirety.

BACKGROUND

1. Technical Field

The embodiments of the present invention relate to an electrowetting display apparatus. More particularly, the embodiments of the present invention relate to an electrowetting display apparatus capable of preventing the occurrence of white pixels in which brightness level is not at a desired level.

2. Discussion of the Related Art

An electrowetting display apparatus has various properties, such as fast response speed, low driving voltage, and a thin profile.

The electrowetting display apparatus uses an electrowetting phenomenon in which a voltage is applied to fluid to vary a surface tension of the fluid, to thereby cause a desired movement or deformation of the fluid. The control of the fluid by using the electrowetting phenomenon is carried out at relatively low voltage, so the power consumption is low.

However, the fluid overflows to neighbor pixels due to external pressure applied thereto while the electrowetting display apparatus is operated. When the fluid overflows to the neighbor pixels, the amount of the fluid left in the pixel from which the fluid overflows is insufficient to display brightness at a desired level.

SUMMARY

Exemplary embodiments of the present invention provide an electrowetting display apparatus capable of preventing the occurrence of white pixels in which brightness is not at a desired level.

According to an exemplary embodiment, an electrowetting display apparatus includes an array substrate, an opposite substrate, and an electrowetting layer. The array substrate includes a base substrate having a plurality of pixel areas and a plurality of pixel electrodes respectively arranged in each of the pixel areas. The pixel electrodes in each pixel area are spaced apart from each other at regular intervals and have an island pattern shape. The opposite substrate faces the array substrate and includes a common electrode, and the electrowetting layer is disposed between the array substrate and the opposite substrate.

The pixel electrodes may be arranged in a matrix form in each pixel area.

The array substrate may further include a plurality of protruding patterns in each pixel area on the base substrate and the pixel electrodes may be respectively disposed on the protruding patterns.

The electrowetting display apparatus may further include a reflective layer disposed between the base substrate and the pixel electrodes.

According to an exemplary embodiment, an electrowetting display apparatus includes an array substrate, an opposite substrate facing the array substrate, and an electrowetting layer disposed between the array substrate and the opposite substrate.

The array substrate includes a base substrate having a plurality of pixel areas, a plurality of pixel electrodes respectively arranged in each of the pixel areas, and a plurality of common electrodes respectively arranged in each of the pixel areas. The pixel electrodes in each pixel area are spaced apart from each other at regular intervals and the common electrodes in each pixel area are spaced apart from each other at regular intervals. The pixel electrodes and the common electrodes in each pixel area are alternately arranged with each other.

An electrowetting display apparatus, according to an embodiment of the present invention, comprises a first substrate comprising a plurality of pixel areas, wherein each pixel area comprises a plurality of pixel electrodes spaced apart from each other at predetermined intervals, and an insulating layer formed on the pixel electrodes, and a second substrate positioned opposite the first substrate, and an electrowetting layer between the first and second substrates, the electrowetting layer including first and second fluids, wherein the first fluid fills in spaces between adjacent pixel electrodes when an electric potential difference occurs between the first and second substrates.

According to the above, electrowetting display apparatuses according to embodiments of the present invention prevent a first fluid of the electrowetting layer from overflowing to adjacent pixel areas. Thus, the electrowetting display apparatuses according to embodiments of the present invention prevent the occurrence of white pixels in which a brightness is not at a desired level.

BRIEF DESCRIPTION OF THE DRAWINGS

The embodiments of the present invention will become readily apparent by reference to the following detailed description when considered in conjunction with the accompanying drawings wherein.

DETAILED DESCRIPTION

Hereinafter, the embodiments of the present invention will be explained in detail with reference to the accompanying drawings.

Figure 1:
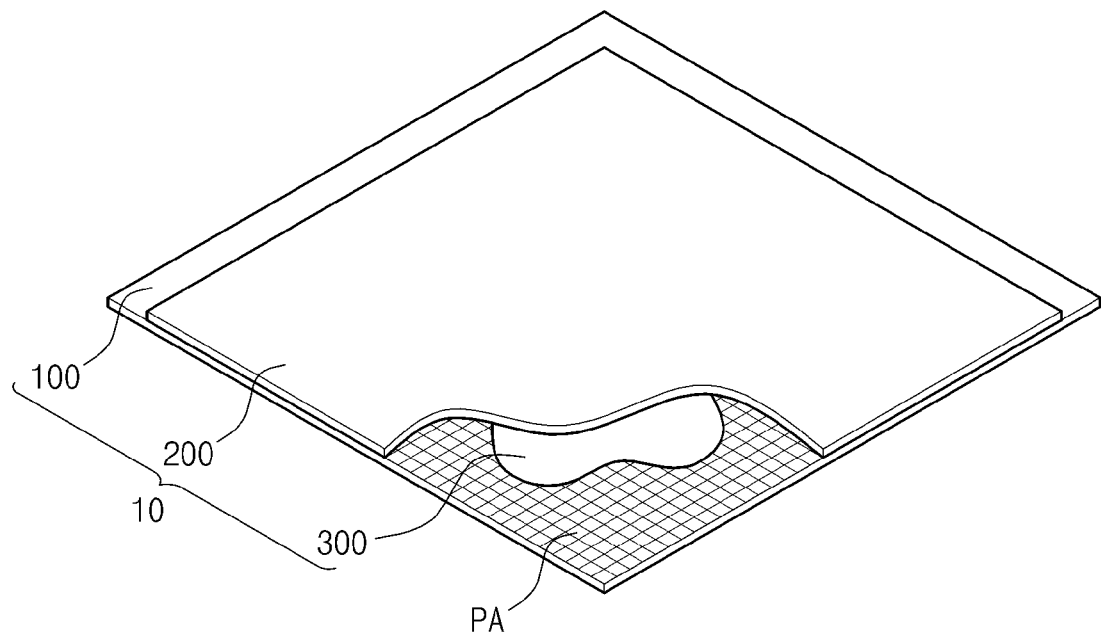
FIG. 1 is a perspective view showing an electrowetting display apparatus according to an exemplary embodiment of the present invention.
Figure 2:
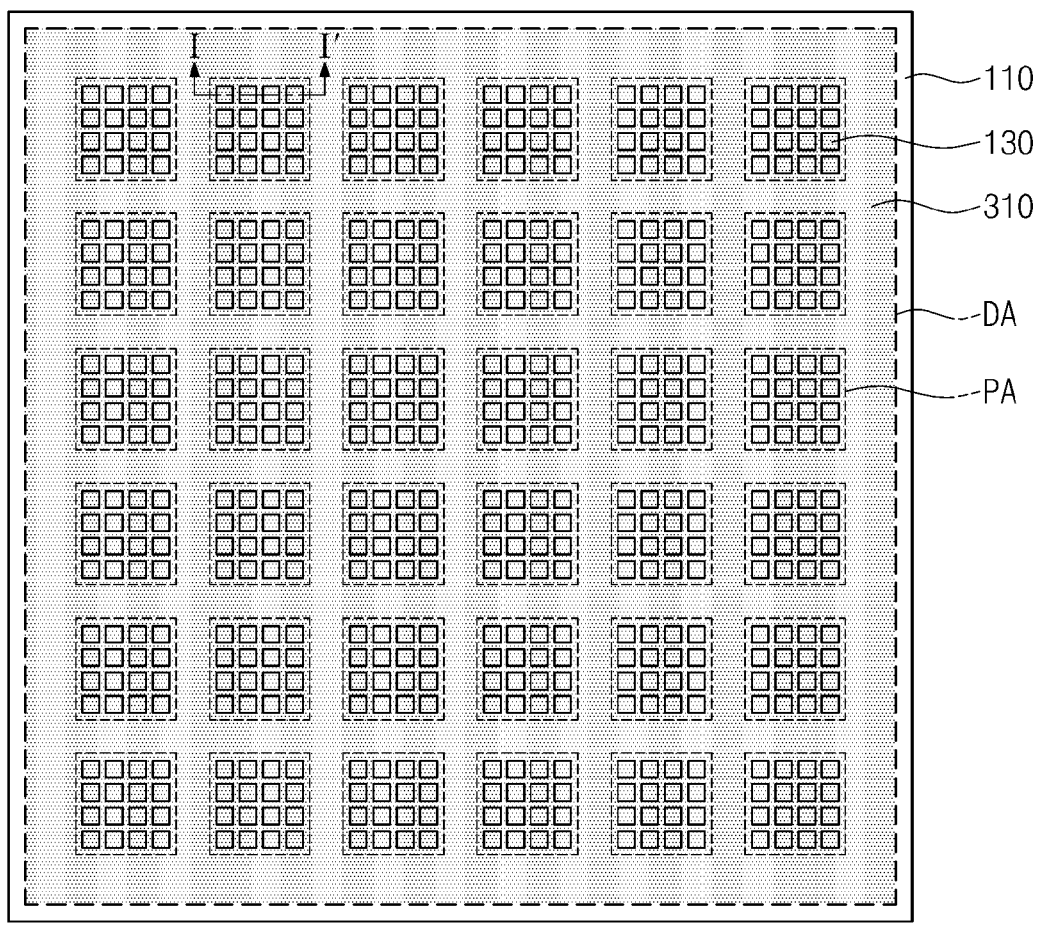
FIG. 2 is a plan view showing an electrowetting display apparatus when power is not applied.
Figure 3:
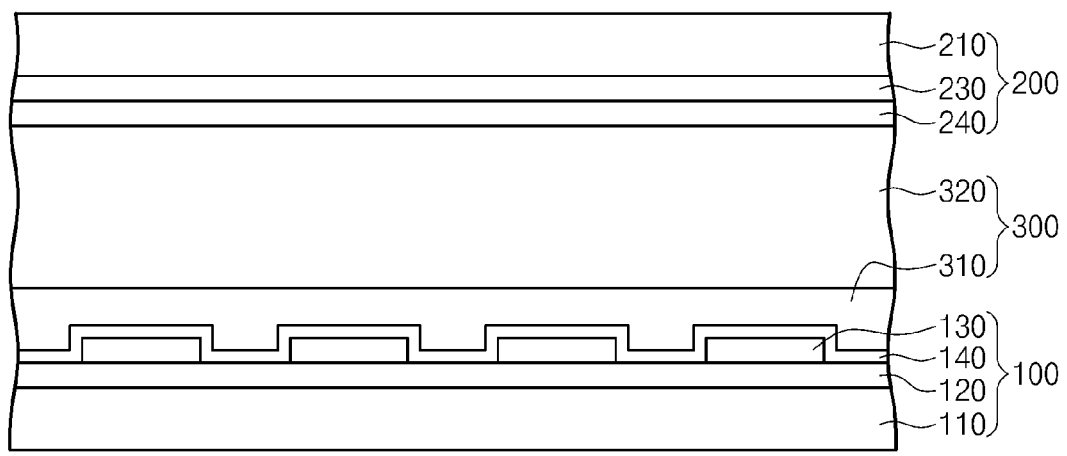
FIG. 3 is a cross-sectional view taken along a line I-I' shown in FIG. 2.
Figure 4:
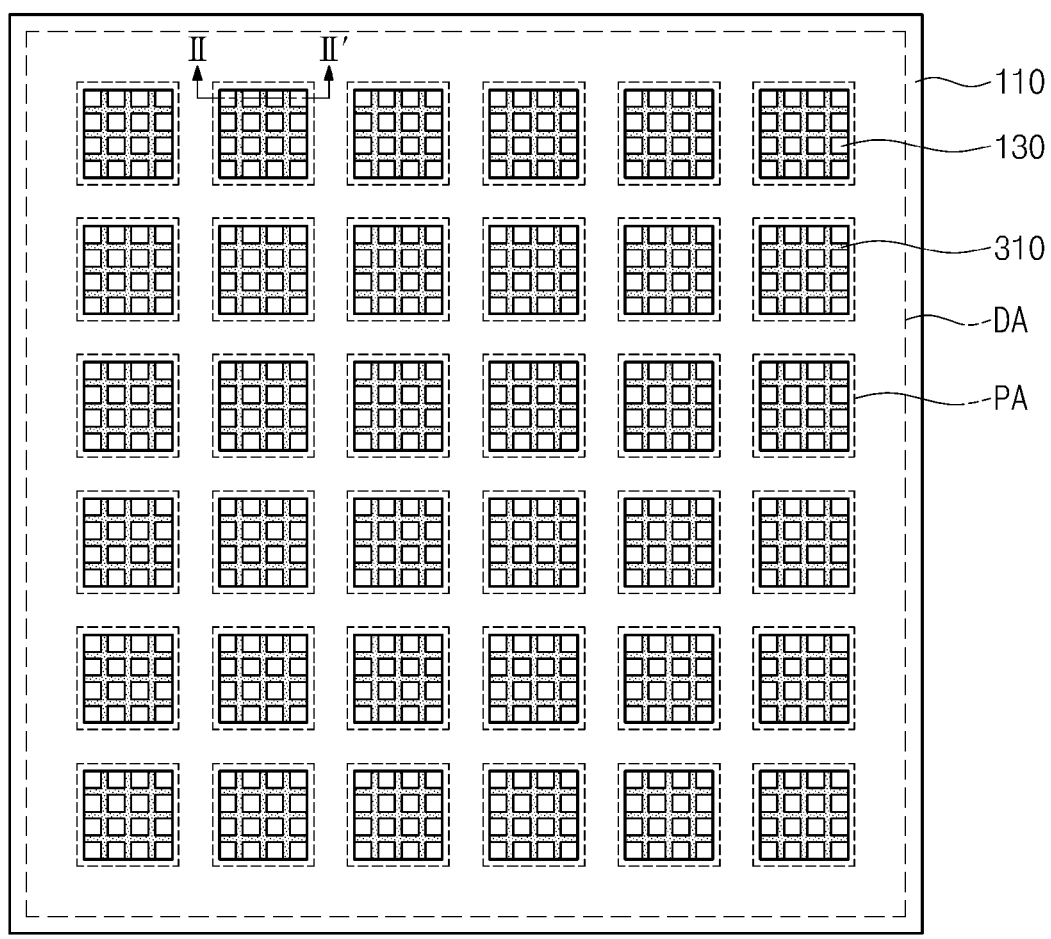
FIG. 4 is a plan view showing an electrowetting display apparatus when power is applied.
Figure 5:
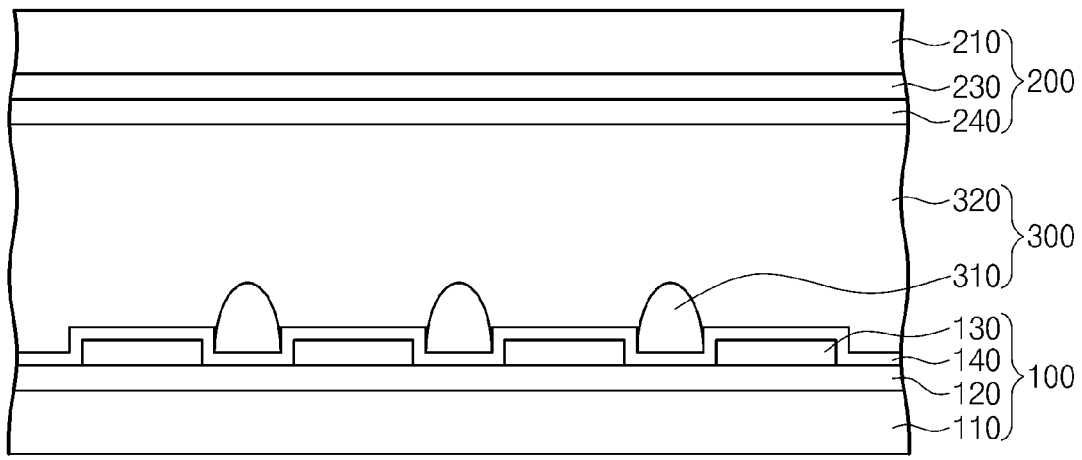
FIG. 5 is a cross-sectional view taken along a line II-IF shown in FIG. 4.

FIG. 1 is a perspective view showing an electrowetting display apparatus according to an exemplary embodiment of the present invention, FIG. 2 is a plan view showing an electrowetting display apparatus when power is not applied, FIG. 3 is a cross-sectional view taken along a line I-I' shown in FIG. 2, FIG. 4 is a plan view showing an electrowetting display apparatus when power is applied, and FIG. 5 is a cross-sectional view taken along a line II-IP shown in FIG. 4.

Referring to FIGS. 1 to 5, the electrowetting display apparatus includes an array substrate 100 including a plurality of pixel areas PA, an opposite substrate 200 facing the array substrate 100, and an electrowetting layer 300 disposed between the array substrate 100 and the opposite substrate 200.

The array substrate 100 includes a first base substrate 110 including the pixel areas PA, a reflective layer 120 disposed on the first base substrate 110, and a plurality of pixel electrodes 130 arranged in each of the pixel areas PA, respectively.

The first base substrate 100 includes a display area DA and a peripheral area (not shown) in which peripheral circuits are arranged. The pixel areas PA are arranged in the display area DA in a matrix form. In addition, each of the pixel areas PA includes a gate line (not shown) extended in a first direction substantially parallel to a side of the array substrate 110 and a data line (not shown) extended in a second direction substantially perpendicular to the first direction. The data line is insulated from the gate line and crosses the gate line. In addition, each of the pixel areas PA includes a thin film transistor (not shown) electrically connected to the gate line and the data line.

The reflective layer 120 is disposed on the first base substrate 110 on which the gate line, the data line, and the thin film transistor are disposed. The reflective layer 120 reflects light (hereinafter, referred to as external light) incident thereto from the outside. In the present exemplary embodiment, the reflective layer 120 includes a material, e.g., a white photoresist, to reflect the external light. According to an embodiment, in the case that the electrowetting display apparatus includes a backlight unit generating the light, the reflective layer 120 is removed from the electrowetting display apparatus.

The pixel electrodes 130 are arranged on the reflective layer 120, and spaced apart from each other at regular intervals. The pixel electrodes 130 include a transparent conductive material, such as indium tin oxide (ITO), and/or indium zinc oxide (IZO). The pixel electrodes 130 are arranged in a matrix form and each of the pixel electrodes 130 has an island pattern shape. In addition, the sum of areas of the pixel electrodes 130 corresponds approximately to the area of about 70% to about 75% or more of the pixel area PA.

A first insulating layer 140 is disposed on the pixel electrodes 130 to insulate the pixel electrodes 130 from each other. According to an embodiment, the first insulating layer 140 has a surface with hydrophobic or oleophilic properties. To this end, according to an embodiment, a hydrophobic material or an oleophilic material may be coated on the first insulating layer 140.

The opposite substrate 200 includes a second base substrate 210, a common electrode 230 facing the pixel electrodes 130, and a second insulating layer 240 covering the common electrode 230. The second insulating layer 240 has a hydrophilic or oleophilic surface.

The common electrode 230 is applied with a common voltage and includes a transparent conductive material, e.g., ITO and/or IZO, to allow the external light provided through the second base substrate 210 to be transmitted to the electrowetting layer 300.

The electrowetting layer 300 includes a first fluid 310 and a second fluid 320 having a specific gravity different from that of the first fluid 310. Thus, the first and second fluids 310 and 320 are not mixed with each other and a boundary exists between the first and second fluids 310 and 320. As an example, the first fluid 310 has the specific gravity larger than that of the second fluid 320.

In addition, one of the first fluid 310 and the second fluid 320 is a polar fluid and the other one of the first fluid 310 and the second fluid 320 is a non-polar fluid. For instance, the first fluid 310 includes a black dye or a material, e.g., oil, absorbing the external light as the non-polar fluid to block the external light, and the second fluid 320 includes water as the polar fluid.

Hereinafter, an operation of the electrowetting display apparatus will be described in further detail.

When no voltage is applied to the pixel electrodes 130 and the common electrode 230, no electric potential difference occurs between the common electrode 230 and the pixel electrodes 130. As a result, variation in the surface tension between the first fluid 310 and the second fluid 320 does not occur. In the present exemplary embodiment, since the first insulating layer 140 has the hydrophobic or oleophilic property, the first fluid 310 is uniformly spread over the first insulating layer 140 as shown in FIGS. 2 and 3. In addition, the first fluid 310 includes the black dye or the material, e.g., oil, to absorb the external light, so the external light or the light provided from the backlight unit is blocked or absorbed by the first fluid 310. Accordingly, the electrowetting display apparatus is in a dark state.

When voltages are applied to the pixel electrodes 130 and the common electrode 230, an electric potential difference occurs between the common electrode 230 and the pixel electrodes 130 and the variation in the surface tension occurs between the first fluid 310 and the second fluid 320 due to the electric potential difference. In the present exemplary embodiment, since the second fluid 320 is the polar fluid, the first fluid 310 moves between the pixel electrodes 130 adjacent to each other as shown in FIGS. 4 and 5. Accordingly, the external light transmits through the electrowetting layer 300 and is reflected by the reflective layer 120. In addition, when the electrowetting display apparatus includes a backlight unit and the reflective layer 120 is removed, the light provided from the backlight unit transmits through the electrowetting layer 300 and the array substrate 100. Thus, since the sum of areas of the pixel electrodes 130 corresponds approximately to the area of about 70% to about 75% or more of the pixel area PA, the electrowetting display apparatus is in a bright state.

In addition, since the first fluid 310 gathers between the pixel electrodes 130 in each pixel area PA, the first fluid 310 does not gather in one area or a specified place. Accordingly, even though external pressure, e.g., a user's touch, is applied to the electrowetting display apparatus, the first fluid 310 does not overflow to an adjacent pixel area PA. As a result, the electrowetting display apparatus according to embodiments of the present invention, prevents the occurrence of white pixels in which the brightness is not at a desired level.

Figure 6:
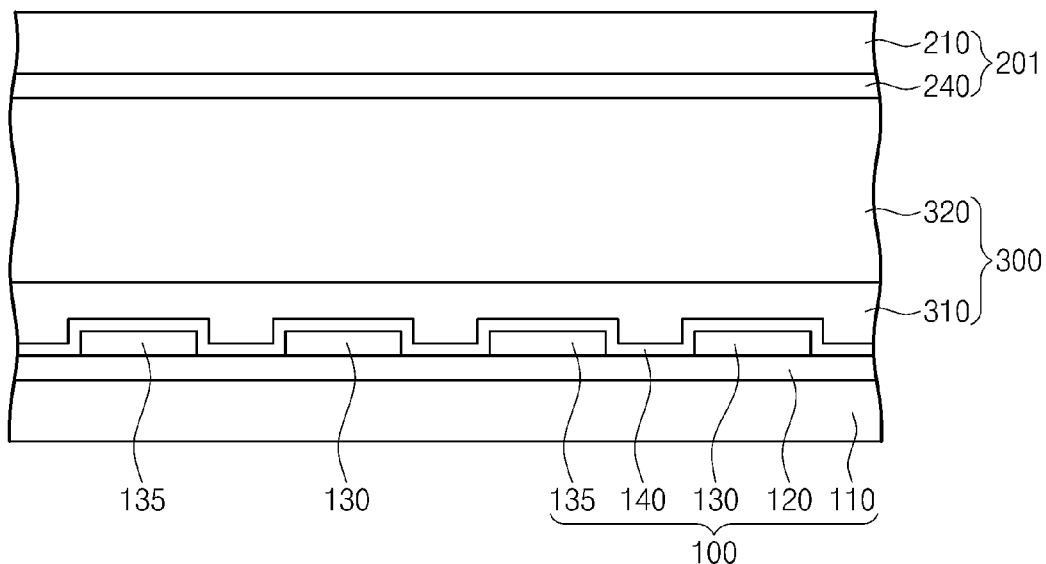
FIGS. 6 and 7 are cross-sectional views showing an electrowetting display apparatus according to another exemplary embodiment of the present invention.
Figure 7:
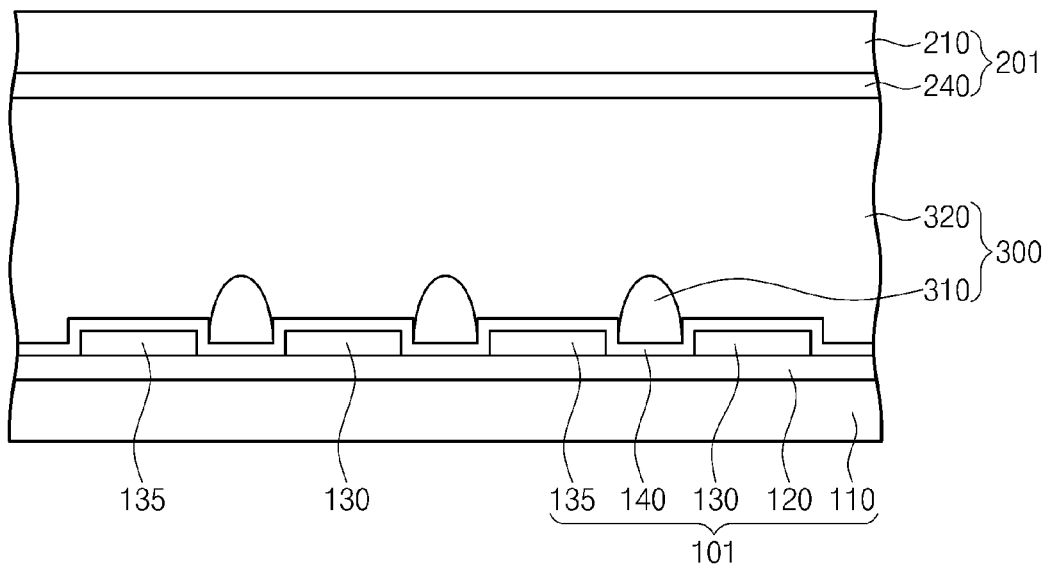
Figure 8:
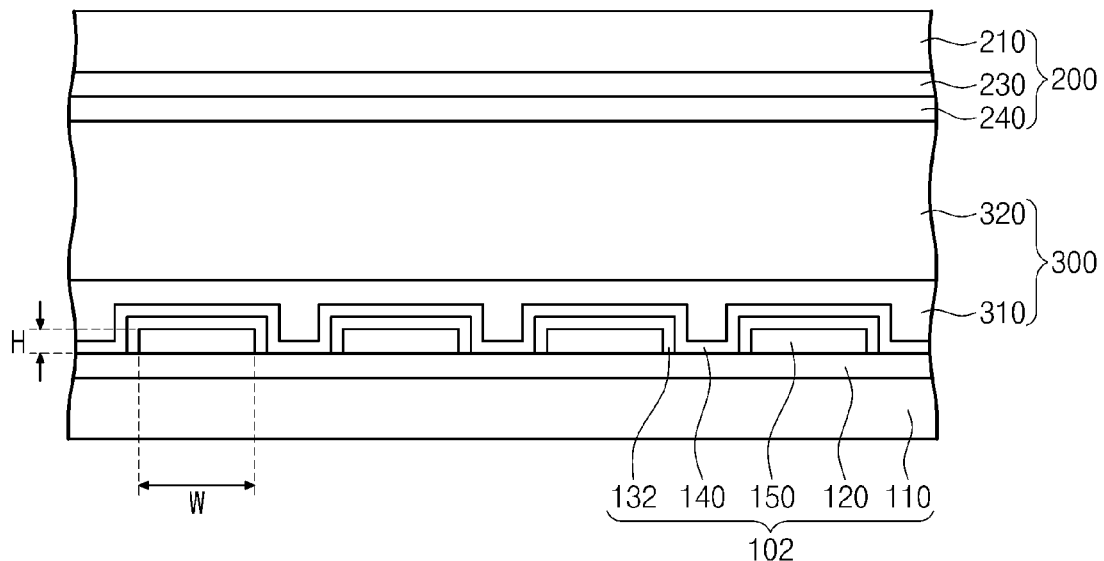
FIGS. 8 to 17 are cross-sectional views showing electrowetting display apparatuses according to other exemplary embodiments of the present invention.
Figure 9:
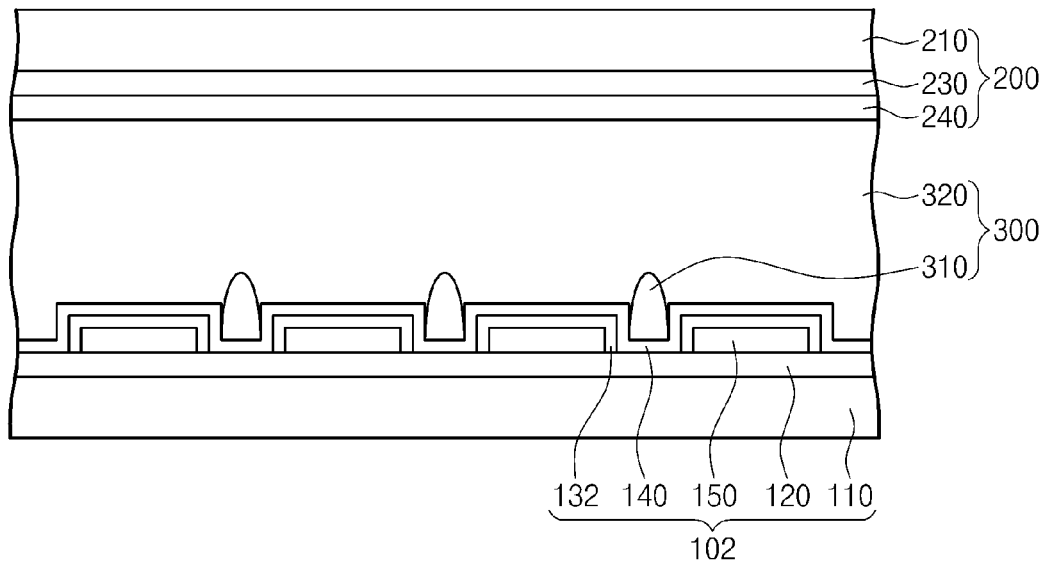

FIGS. 6 and 7 are cross-sectional views showing an electrowetting display apparatus according to another exemplary embodiment of the present invention. In FIGS. 6 and 7, the same or similar reference numerals denote the same or similar elements in FIGS. 1 to 5. In addition, FIGS. 6 and 7 show the electrowetting display apparatus to which a horizontal electric field is applied. FIG. 6 shows the electrowetting display apparatus when power is not applied and FIG. 7 shows the electrowetting display apparatus applied when power is applied.

Referring to FIGS. 6 and 7, the electrowetting display apparatus includes an array substrate 101, an opposite substrate 201 facing the array substrate 101, and an electrowetting layer 300 disposed between the array substrate 101 and the opposite substrate 201.

The array substrate 101 includes a plurality of pixel electrodes 130 arranged on the reflective layer 120 and spaced apart from each other at regular intervals and a plurality of common electrodes 135 alternately arranged with the pixel electrodes 130. The first insulating layer 140 is disposed on the pixel electrodes 130 and the common electrodes 135 to insulate the pixel electrodes 130 and the common electrodes 135 from each other. In the present exemplary embodiment, the common electrodes 135 receive a reference voltage to generate the horizontal electric field in cooperation with the pixel electrodes 130.

The opposite substrate 201 includes a second base substrate 210 and a second insulating layer 240 disposed on the second base substrate 210. The opposite substrate 201 does not include a common electrode. According to an embodiment, the second insulating layer 240 may be omitted from the opposite substrate 201.

In operation, when a voltage is not applied to the pixel electrodes 130 and the common electrodes 135, the first fluid 310 is uniformly disposed on the first insulating layer 140 as shown in FIG. 6 since the first insulating layer 140 has the hydrophobic or oleophilic property. Accordingly, external light provided to the electrowetting display apparatus is blocked or absorbed by the first fluid 310, so the electrowetting display apparatus is in the dark state.

When voltages are applied to the pixel electrodes 130 and the common electrodes 135, the electric potential difference occurs between the common electrodes 135 and the pixel electrodes 130 and the first fluid 310 moves between each of the pixel electrodes 130 and each of the common electrodes 135 adjacent to the pixel electrodes 130 as shown in FIG. 7. Thus, the electrowetting display apparatus is in the bright state.

FIGS. 8 to 17 are cross-sectional views showing electrowetting display apparatuses according to other exemplary embodiments of the present invention. In FIGS. 8 to 17, the same or similar reference numerals denote the same or similar elements in FIGS. 1 to 5. FIGS. 8, 10, 12, 14, and 16 show the electrowetting display apparatuses when power is not applied and FIGS. 9, 11, 13, 15, and 17 show the electrowetting display apparatuses when power is applied.

Referring to FIGS. 8 to 13, the array substrates 102 and 103 include a plurality of protruding patterns 150 or 150a arranged on the reflective layer 120 in a matrix form to be spaced apart from each other at regular intervals. The protruding patterns 150, 150a have an island shape. According to an embodiment, the protruding patterns 150, 150a include a transparent organic material through which light transmits. In addition, each of the protruding patterns 150, 150a has a height (H) of about 5 micrometers and a width (W) of about 0.5 micrometers to about 15 micrometers.

The pixel electrodes 132 are disposed on the protruding patterns 150, respectively, as shown in FIGS. 8 to 11. Each of the pixel electrodes 132 is disposed on a corresponding protruding pattern of the protruding patterns 150, 150a to surround upper and side surfaces of the corresponding protruding pattern of the protruding patterns 150, 150a.

Figure 12:
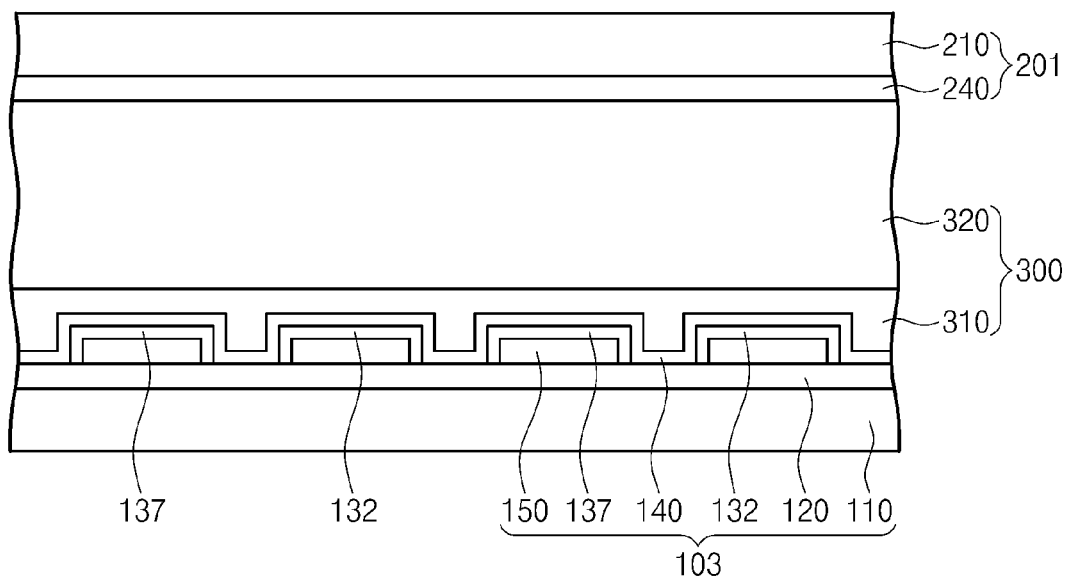
Figure 13:
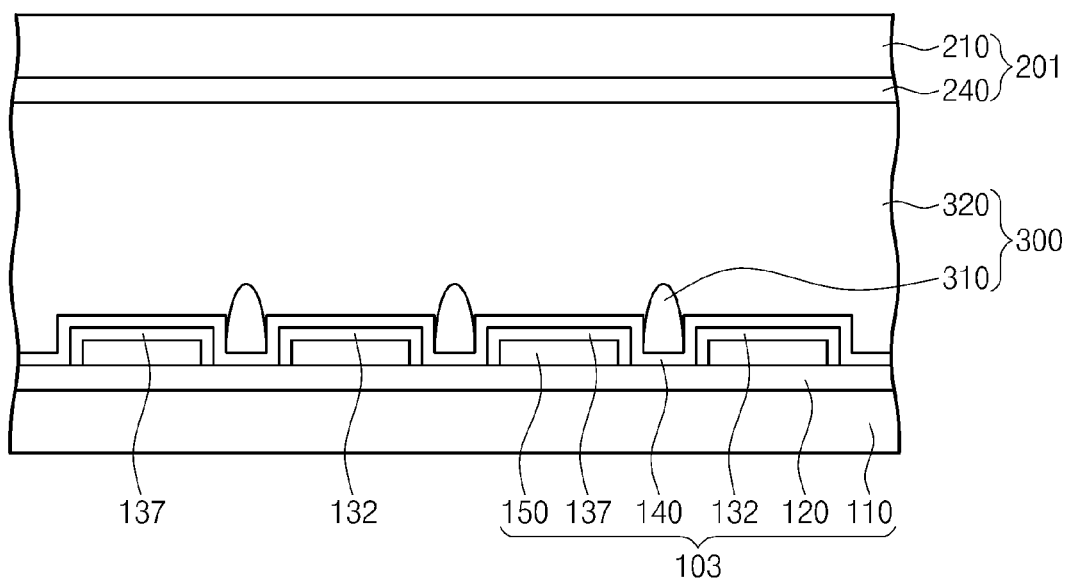
Figure 14:
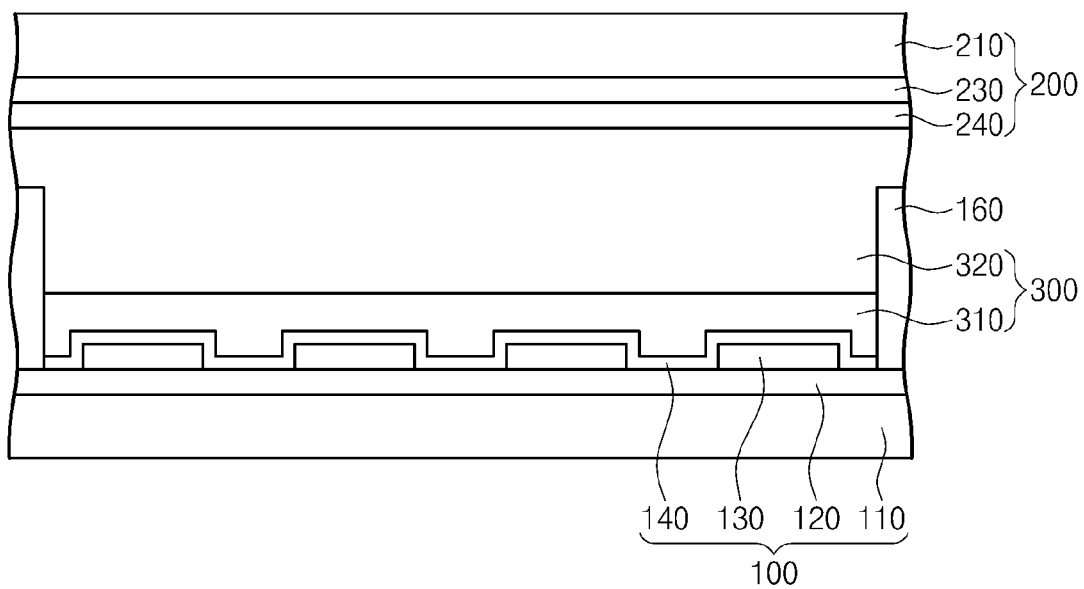
Figure 15:
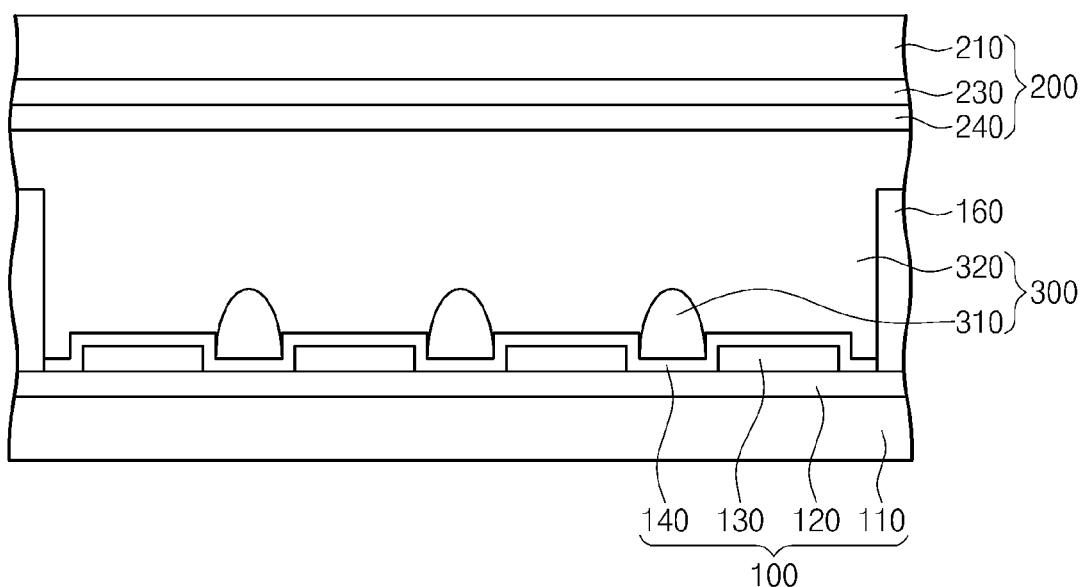
Figure 16:
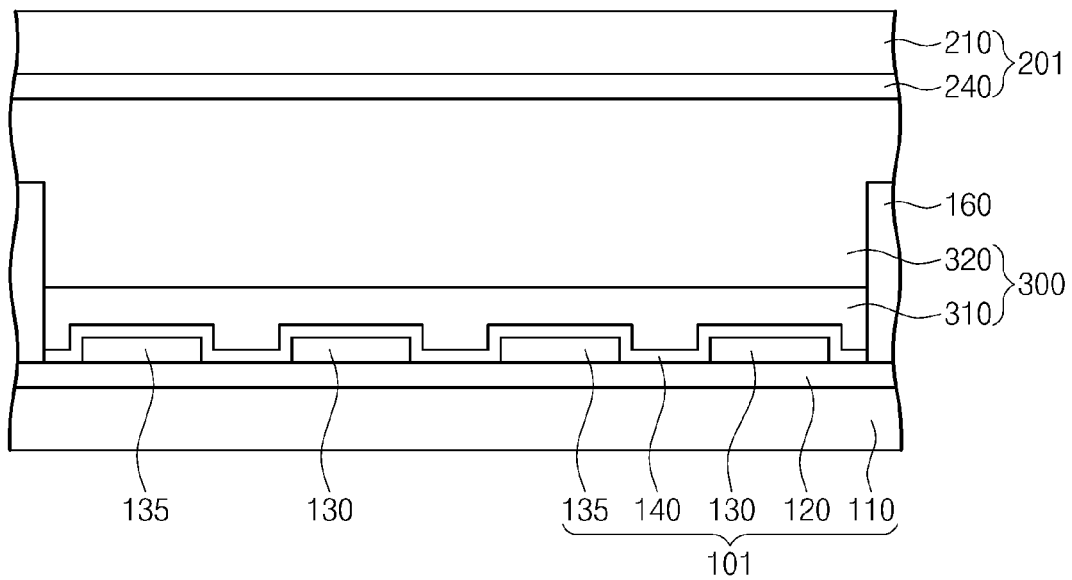
Figure 17:
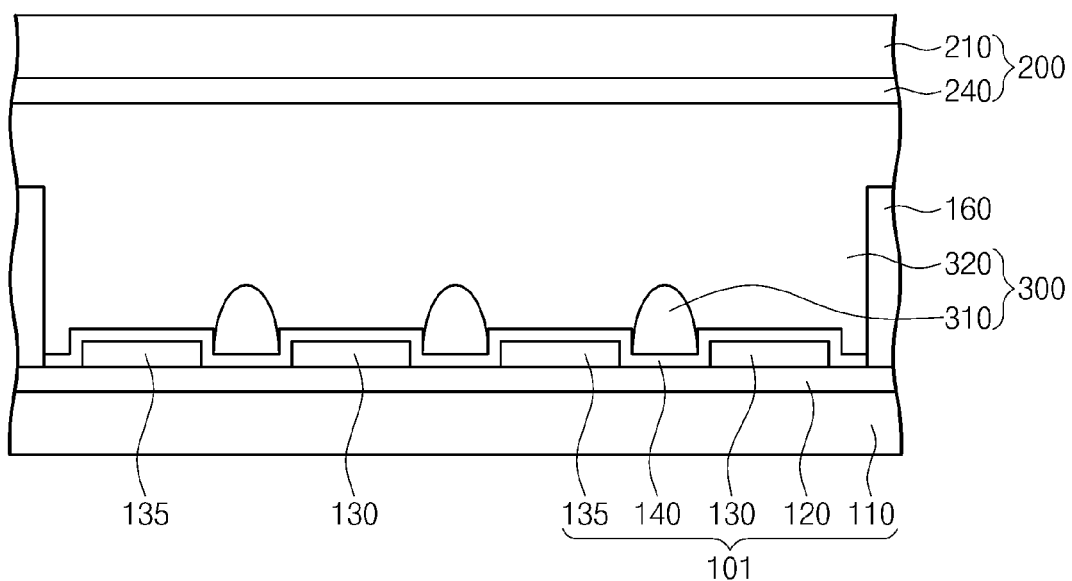

In addition, as shown in FIGS. 12 and 13, according to an embodiment of the present invention, the pixel electrodes 130 are alternately arranged on the protruding patterns 150 with common electrodes 137. The pixel electrodes 132 and the common electrodes 137 are disposed on the protruding patterns 150 to cover the upper and side surfaces of the protruding patterns 150.

Figure 10:
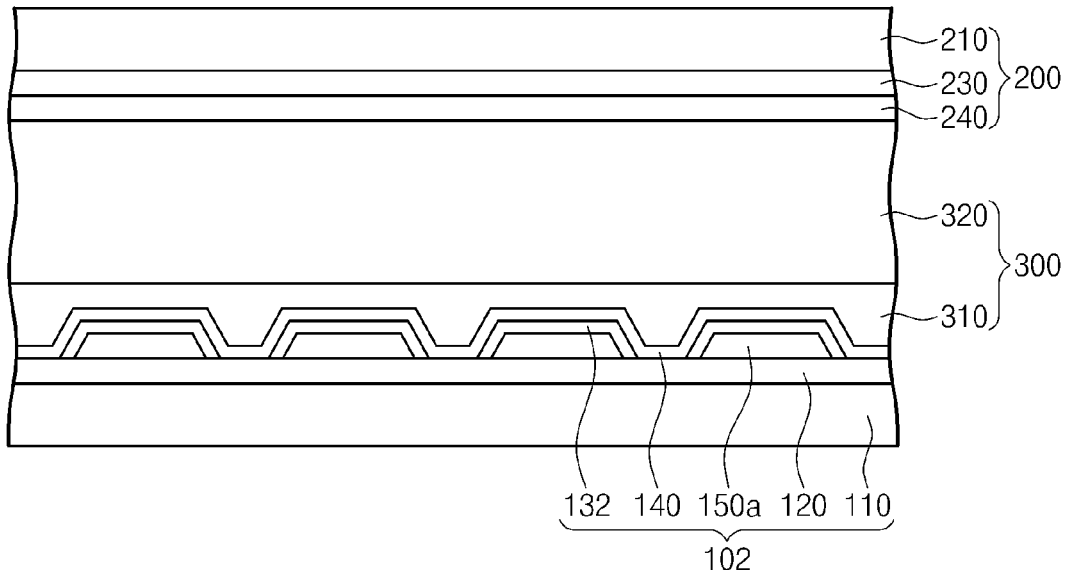
Figure 11:
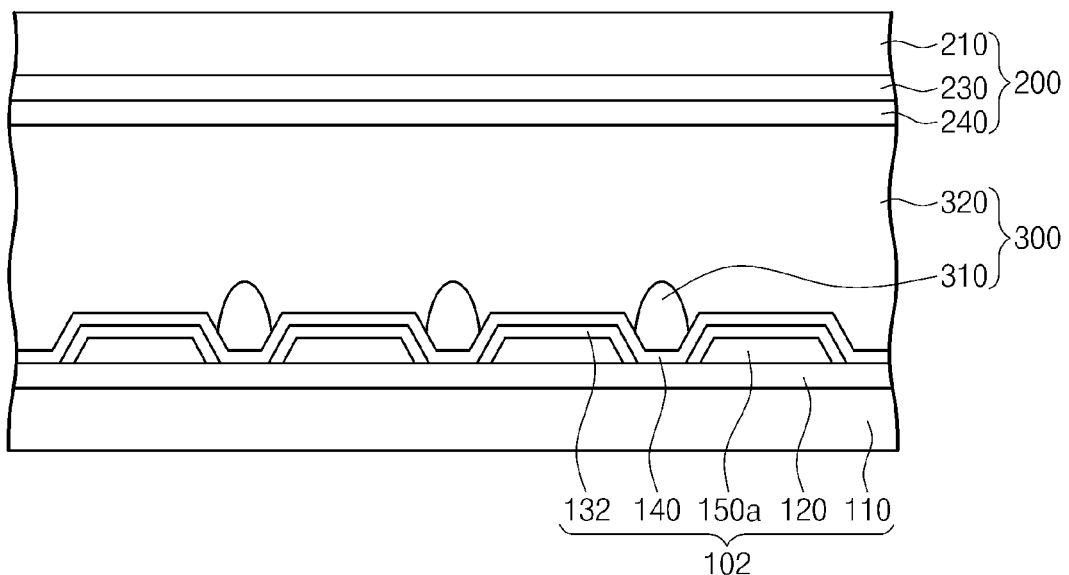

The protruding patterns 150, 150a may have various cross-sectional shapes. For instance, the protruding patterns 150a have a trapezoid shape in a cross-sectional view as shown in FIGS. 10 and 11. In addition, the protruding patterns 150 have a rectangular shape in a cross-sectional view as shown in FIGS. 8, 9, 12, and 13.

The above-mentioned protruding patterns 150, 150a increase a receiving space, in which the first fluid 310 is accommodated, in the array substrates 102, 103 by the height (H) thereof. Accordingly, when power is applied to the pixel electrodes 132 and the common electrodes 137 and 230, the first fluid 310 is accommodated between the pixel electrodes 132 shown in FIG. 8 to 11 or between the pixel electrodes 132 and the common electrodes 137 shown in FIGS. 12 and 13. Thus, due to the increased receiving space, a height of the first fluid 310 protruding from a surface of the array substrates 102, 103 may be decreased when power is applied to the pixel electrodes 132 and the common electrodes 137 and 230. Consequently, although external pressure, e.g., a user's touch, is applied to the electrowetting display apparatus, the first fluid 310 does not overflow to an adjacent pixel area PA. As a result, the electrowetting display apparatus prevents the occurrence of white pixels in which the brightness is not at a desired level.

Referring to FIGS. 14 to 17, the electrowetting display apparatuses further include a barrier wall 160 disposed between the pixel areas PA on the array substrates 100, 101. The barrier wall 160 prevents the first fluid 310 from overflowing to the neighbor pixels PA. According to embodiments, although not shown, the barrier wall 160 may also be applied to array substrates 102 and 103.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:
1. An electrowetting display apparatus comprising:
an array substrate including:
a base substrate having a plurality of pixel areas;
a thin film transistor disposed in each of the plurality of pixel areas; and
a plurality of pixel electrodes arranged in each of the plurality of pixel areas and connected to the thin film transistor, the plurality of pixel electrodes spaced apart from each other by predetermined gaps in each pixel area;
an opposite substrate facing the array substrate and including a common electrode; and
an electrowetting layer disposed between the array substrate and the opposite substrate, the electrowetting layer comprising a first fluid and a second fluid,
wherein the first fluid is a polar fluid and the second fluid is a non-polar fluid,
wherein the first fluid overlaps the gaps between adjacent pixel electrodes and doesn't overlap the pixel electrodes when an electric potential difference occurs between the pixel electrodes and the common electrode, and wherein the plurality of pixel areas are formed so that multiple pixel electrodes and a single thin film transistor correspond to a single pixel area.

2. The electrowetting display apparatus of claim 1, wherein the pixel electrodes in each pixel area are arranged in a matrix form.

3. The electrowetting display apparatus of claim 2, wherein a sum of areas of the pixel electrodes in a pixel area corresponds approximately to an area of about 75% or more of the pixel area.

4. The electrowetting display apparatus of claim 2, wherein the array substrate further comprises a plurality of protruding patterns on the base substrate and the pixel electrodes are respectively disposed on the protruding patterns.

5. The electrowetting display apparatus of claim 4, wherein the pixel electrodes have a shape to respectively cover the protruding patterns.

6. The electrowetting display apparatus of claim 4, wherein the protruding patterns in each pixel area are arranged in the matrix form.

7. The electrowetting display apparatus of claim 4, wherein the protruding patterns comprise a transparent organic material.

8. The electrowetting display apparatus of claim 4, wherein the protruding patterns have a height equal to or smaller than about 5 micrometers.

9. The electrowetting display apparatus of claim 4, wherein the protruding patterns have a width of about 0.5 micrometers to about 15 micrometers.

10. The electrowetting display apparatus of claim 1, wherein the second fluid has a specific gravity different from the first fluid.

11. The electrowetting display apparatus of claim 1, further comprising a reflective layer disposed between the base substrate and the pixel electrodes.

12. The electrowetting display apparatus of claim 1, further comprising a barrier wall disposed between at least two adjacent pixel areas, wherein the barrier wall is not disposed in each of the pixel areas.

13. The electrowetting display apparatus of claim 1, wherein the array substrate further comprises a first insulating layer covering the pixel electrodes and having a hydrophobic or oleophilic surface.

14. The electrowetting display apparatus of claim 1, wherein the opposite substrate further comprises a second insulating layer covering the common electrode and having a hydrophilic surface.

15. An electrowetting display apparatus comprising:
an array substrate including a base substrate having a plurality of pixel areas, a thin film transistor disposed in each of the plurality of pixel areas, a plurality of pixel electrodes arranged in each of the pixel areas and connected to a corresponding thin film transistor, and a plurality of common electrodes arranged in each of the pixel areas, the pixel electrodes in each pixel area being spaced apart from each other by predetermined gaps and the common electrodes in each pixel area being spaced apart from each other by predetermined gaps, the pixel electrodes and the common electrodes being alternately arranged with each other;
an opposite substrate facing the array substrate; and
an electrowetting layer disposed between the array substrate and the opposite substrate, the electrowetting layer comprising a first fluid and a second fluid,
wherein the first fluid is a polar fluid and the second fluid is a non-polar fluid,
wherein the first fluid overlaps the gaps between adjacent pixel electrodes and doesn't overlap the pixel electrodes when electric potential difference occurs between the pixel electrodes and the common electrodes, and
wherein the plurality of pixel areas are formed so that multiple pixel electrodes and a single thin film transistor correspond to a single pixel area.

16. The electrowetting display apparatus of claim 15, wherein a sum of areas of the pixel electrodes and the common electrodes in a pixel area corresponds approximately to an area of about 75% or more of the pixel area.

17. The electrowetting display apparatus of claim 15, wherein the array substrate further comprises a plurality of protruding patterns on the base substrate, and the pixel electrodes and the common electrodes are disposed on the protruding patterns.

18. The electrowetting display apparatus of claim 17, wherein the protruding patterns have a height equal to or smaller than about 5 micrometers.

19. The electrowetting display apparatus of claim 17, wherein the protruding patterns have a width of about 0.5 micrometers to about 15 micrometers.

20. The electrowetting display apparatus of claim 1, wherein the first fluid overlaps at least a portion of the gaps defined between each of the plurality of pixel electrodes when the electric potential difference occurs between the pixel electrodes and the common electrode, and
wherein the first fluid overlaps both of the gaps and the pixel electrodes when the electric potential of the pixel electrodes is equal to the electric potential of the common electrode.

\* \* \* \* \*